United States Patent
Michaelis et al.

(10) Patent No.: US 6,846,335 B2
(45) Date of Patent: Jan. 25, 2005

(54) CRYSTAL FORM OF A PERINONE DYE

(75) Inventors: Stephan Michaelis, Odenthal (DE); Josef-Walter Stawitz, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 86 days.

(21) Appl. No.: 10/105,846

(22) Filed: Mar. 25, 2002

(65) Prior Publication Data

US 2002/0193577 A1 Dec. 19, 2002

(30) Foreign Application Priority Data

Mar. 29, 2001 (DE) .......................................... 101 15 404

(51) Int. Cl.[7] ................................................ C09B 5/44
(52) U.S. Cl. .............................. 8/526; 544/245; 524/90
(58) Field of Search ................................ 544/245, 294; 524/90; 8/526

(56) References Cited

U.S. PATENT DOCUMENTS

| 2,955,902 A | * 11/1960 | Merian |
| 5,213,583 A | 5/1993 | Kaspar et al. .................. 8/526 |
| 5,830,931 A | 11/1998 | Pelster et al. .................. 524/90 |

* cited by examiner

Primary Examiner—Margaret Einsmann
(74) Attorney, Agent, or Firm—Diderico van Eyl; Godfried R. Akorli

(57) ABSTRACT

A novel crystal form of C.I. Solvent Orange 60 gives a higher space-time yield in dye synthesis and is more easily finished.

8 Claims, 2 Drawing Sheets

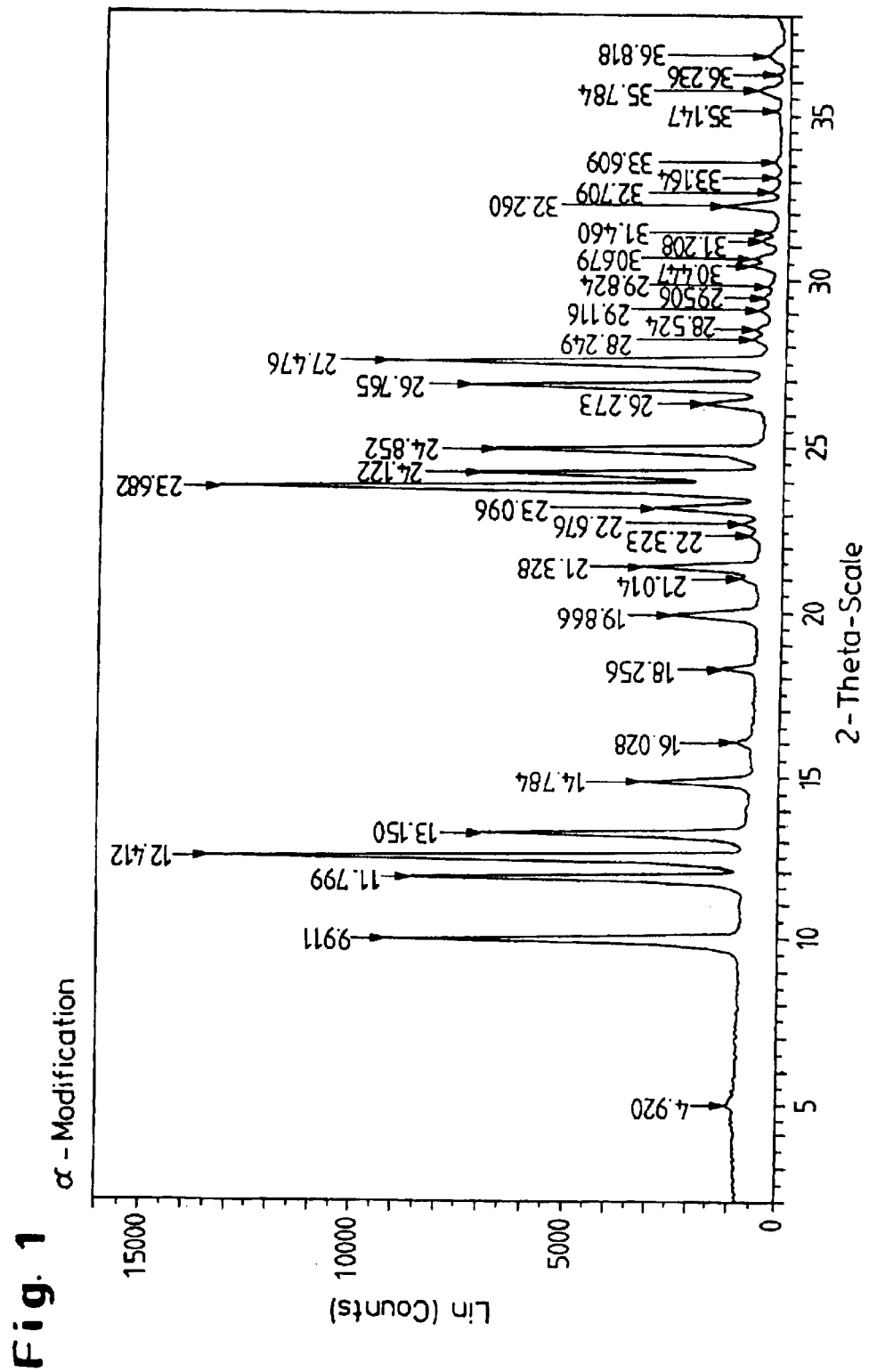

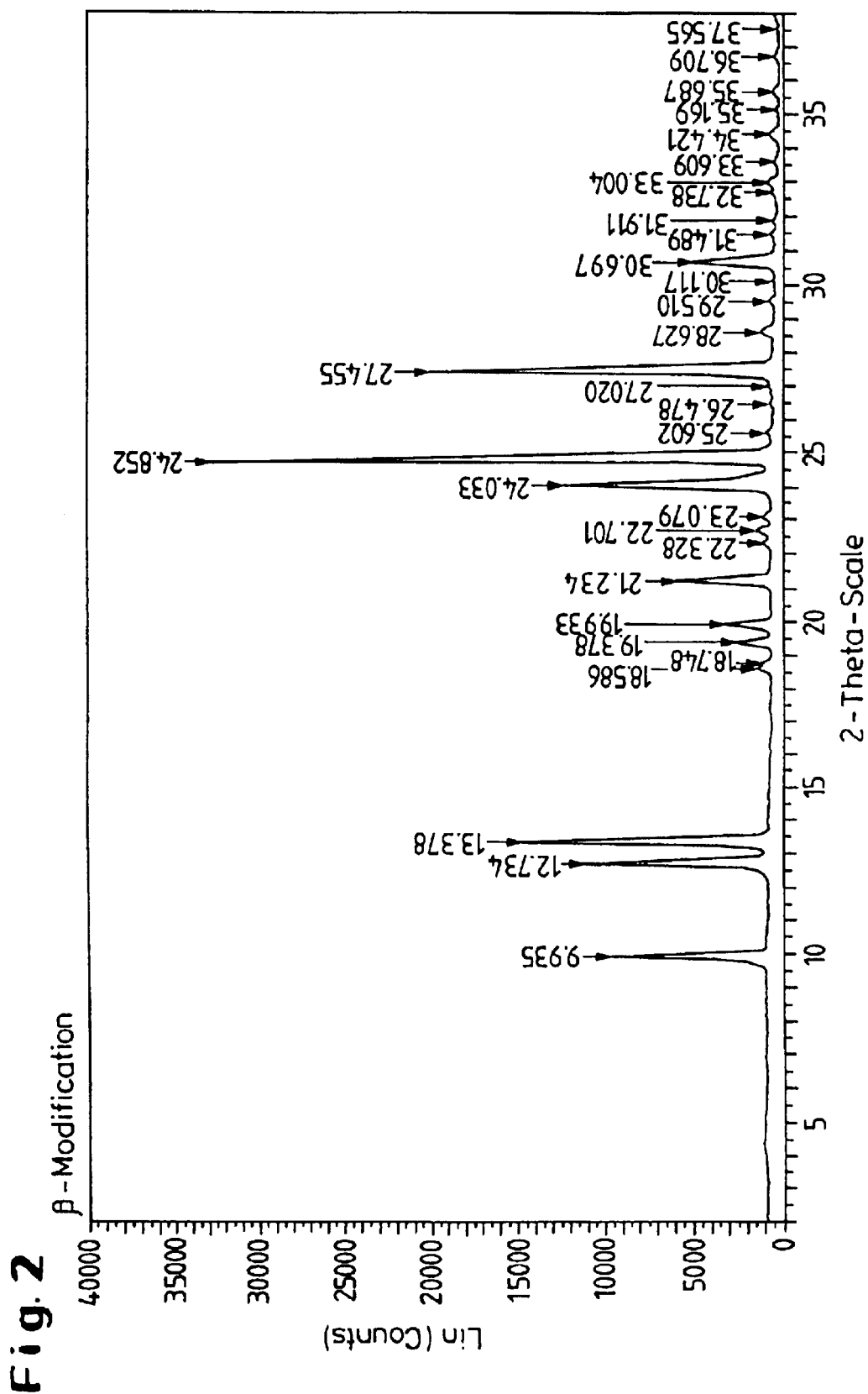
Fig. 2 β-Modification

CRYSTAL FORM OF A PERINONE DYE

BACKGROUND OF THE INVENTION

The invention relates to a novel crystal form of a perinone dye of the formula (I), a process for its preparation and its use for mass coloration of plastics.

The dye of the formula (I)

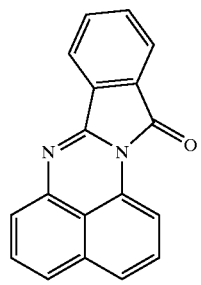
(I)

(=C.I. Solvent Orange 60) when prepared in the prior art, for example as in EP-A-780 444 or in B. K. Manukian Helv. Chimica Acta 1965, Vol. 48, p. 1999–2004, is in the -form whose X-ray diffraction diagram (C-K radiation) is reproduced in FIG. 1 and which is characterized by lines at the following diffraction angles 2 (°)
9.911, 11.799, 12.412, 13.150, 23.682, 24.122, 24.852, 26.765, 27.476.

The dye of the formula (I) In the α-form is a widely used colorant for mass coloration of plastics and other applications. However, there are a number of disadvantages in need of improvement. For instance, the known dye in powder form has a low bulk density and is prone to dusting in handling. Moreover, production of a granular or pulverulent product by spray drying of an aqueous slurry is uneconomical because of the very low solids content of the slurry.

It is an object of the present invention to remedy these disadvantages.

SUMMARY OF THE INVENTION

The invention relates to a dye of the formula (I)

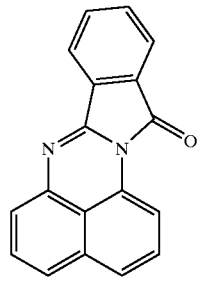
(I)

in a crystal form (β-form) that comprises lines at the following diffraction angles 2 (°):
9.935, 12.734, 13.378, 24.033, 24.852, 27.455
in the X-ray diffraction diagram (Cu-K$_\alpha$ radiation).

BRIEF DESCRIPTION OF THE DRAWINGS

The X-ray diffraction diagram of the -form recorded with Cu-K radiation is depicted in FIG. 1 and that of the β-form is depicted in FIG. 2. The diagrams were recorded using a computer-controlled STOE STADI β powder diffractometer.

DETAILED DESCRIPTION OF THE INVENTION

The invention also relates to a process comprising reacting phthalic anhydride and 1,8-diaminonaphthalene at a temperature of 90 to 200° C. in an organic solvent in the presence of trimellitic acid or derivatives thereof.

Suitable trimellitic acid derivatives include trimellitic anhydrides, esters, salts or compounds of the formula (II)

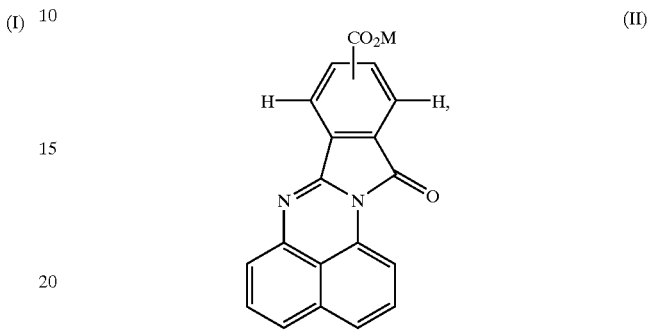
(II)

where
M is H, an alkali metal or an alkaline earth metal.

Preference is given to using 0.9 to 1.4, especially 1.05 to 1.25, mol equivalents of phthalic anhydride, based on 1 mol of 1,8-diamino-naphthalene.

The amount of trimellitic acid or trimellitic acid derivative is preferably 0.005 to 0.1, more preferably 0.02 to 0.05, mol equivalents, based on 1 mol of 1,8-diaminonaphthalene.

Suitable organic solvents include N-methylpyrrolidone, phenol, dichlorobenzene, nitrobenzene, chlorobenzene and/or glycol, preferably N-methylpyrrolidone.

The reaction is preferably carried out at a temperature of 100 to 160° C.

The condensation reaction is accelerated by using, in addition to trimellitic acid, acids such as mineral acids like hydrochloric acid, sulphuric acid or phosphoric acid, but preferably organic acids other than trimellitic acid, for example aliphatic or aromatic carboxylic acids or sulphonic acids, such as taurine or toluenesulphonic acid.

Such reaction accelerants are preferably used in an amount of 0.001 to 1, especially 0.01 to 0.2, mol equivalents, based on 1,8-diaminonaphthalene.

The invention likewise relates to the product obtainable according to the process according to the invention, whose X-ray diffraction diagram has lines at the same diffraction angles as reported for the β-form.

In a preferred embodiment of the process according to the invention, 1,8-diaminonaphthalene is added at reaction temperature to a solution or suspension of phthalic anhydride and trimellitic acid or trimellitic acid derivative in an organic solvent. The 1,8-diaminonaphthalene can be added in dissolved form, for example in an organic solvent such as N-methylpyrrolidone, in molten form or in solid form.

The invention further relates to a process for preparing the dye of the formula (I) in the β-form, which is characterized in that the dye of the formula (I) in the α-form as described above is dissolved in an organic solvent, for example in one of the above-specified solvents, especially in N-methylpyrrolidone, preferably at a temperature of 80 to 160° C., and the dye of the formula (I) is precipitated in the presence of trimellitic acid or derivatives thereof, preferably in the presence of a compound of the formula II.

The invention further provides an aqueous dispersion containing 20 to 50% by weight of the dye of the formula I in the β-form and 0.1 to 5% by weight of a dispersant, based on the dye present in the dispersion.

Useful dispersants are in particular the polyglycols disclosed in EP-A 488 933.

In a preferred embodiment, the polyglycol has a molecular weight of 900–15 000, especially 5000–8000, g/mol, calculated from the OH number. In a further preferred embodiment, the polyglycol is a copolymer of propylene oxide and ethylene oxide. In a further preferred embodiment, the polyglycol is a copolymer of propylene oxide and ethylene oxide which has an average molar mass, calculated from the OH number, of 2000 to 10 000 g/mol.

In a further preferred embodiment, the amount of polyglycol is 1–3% by weight, based on the dry dye.

The advantage of the aqueous dispersion according to the invention is the higher dye content compared with a corresponding dispersion containing the dye of the formula I in the α-form.

The aqueous dispersion can also be spray dried, in which case the spray drying conditions mentioned in EP-A-488 933 are preferably applied.

The invention also relates to a solid preparation containing 95 to 99.9% by weight of dye of the formula I in the β-form and 0.1 to 5% by weight of a dispersant, based on the dye.

The dispersant is preferably one of the polyols indicated above.

The solid preparations according to the invention are preferably obtained by spray drying the aqueous dispersion according to the invention.

The solid preparation according to the invention preferably contains 95 to 99.9% by weight of dye of the formula I in the β-form and 0.1 to 5% by weight of a dispersant, the sum total of dye of the formula I in the β-form and dispersant, based on the solid preparation, is more than 96% by weight, preferably more than 97%, especially more than 99%, by weight.

The solid preparation is preferably a pulverulent or granular product.

The dye of the formula (I) according to the invention in the β-form is very useful for mass coloration of plastics. The dye of the formula (I) produces orange colorations.

Therefore the invention also relates to a composition containing the dye and a plastic.

Mass coloration, as the term is used herein, describes especially processes in which the dye is incorporated into the molten plastic material, for example using an extruder, or in which the dye is added to starting components for the production of the plastic, for example to monomers prior to polymerization.

Suitable plastics include thermoplastics, for example vinyl polymers, polyesters, polyamides and also polyolefins, for example polyethylene and polypropylene, or polycarbonates.

Suitable vinyl polymers include polystyrene, styrene-acrylonitrile copolymers, styrene-butadiene copolymers, styrene-butadiene-acrylonitrile terpolymers, polymethacrylate, and polyvinyl chloride.

Also useful are polyesters such as for example polyethylene terephthalates, polycarbonates and cellulose esters.

Preference is given to polystyrene, styrene interpolymers, polycarbonates, polymethacrylates and polyamides. Particular preference is given to polystyrene, polyethylene and polypropylene.

The macromolecular compounds mentioned can be present individually or in mixtures, as plastically deformable materials or melts.

The dyes according to the invention are preferably applied in finely divided form, for which the use of dispersants is possible but not mandatory.

When the dye (I) is used in the β-form after polymerization of the plastic, it is preferably mixed or ground dry with the polymer chips and this mixture is plastificated and homogenized, for example on mixing rolls or in screws. But the dyes can also be added to the liquid melt and homogeneously dispersed therein by stirring. This precoloured material can then be further processed as usual, for example by spinning, into bristles, filaments, etc. or by extrusion or injection moulding into shaped articles.

Since the dye of the formula (I) is stable to polymerization catalysts, especially peroxides, it is also possible to add the dye to the monomeric starting materials for the plastics and then to polymerize in the presence of polymerization catalysts. To this end, the dye is preferably dissolved in or intimately mixed with the monomeric components.

The dye of the formula (I) in the β-form is preferably used for colouring the polymers mentioned in amounts of 0.0001 to 1% by weight, especially 0.01 to 0.5% by weight, based on the amount of polymer.

By adding pigments insoluble in the polymers, for example titanium dioxide, it is possible to obtain corresponding useful hiding colorations.

Suitable amounts of titanium dioxide are about 0.01 to 10% by weight, preferably 0.1 to 5% by weight, based on the amount of polymer.

The process according to the invention provides transparent or hiding brilliant orange colorations possessing good thermal stability and also good fastness to light, weather and sublimation.

The process according to the invention can also utilize mixtures of the dye of the formula (I) with other dyes and/or inorganic or organic pigments.

The examples hereinbelow, in which the parts and percentages are by weight, illustrate the invention.

EXAMPLES

Comparative Example 1

The dye of the formula (I) was prepared similarly to the procedure of Example 1 in U.S. Pat. No. 5,830,931. The dye thus obtained was in the α-form and had the X-ray diffraction diagram of FIG. 1.

Comparative Example 2

The dye of the formula (I) was prepared similarly to B. K. Manukian, Helvetica Chimica Acta, p. 2002, compound II. The dye thus obtained was likewise in the α-form and had the X-ray diffraction diagram of FIG. 1.

Inventive Example 1

To a mixture of 340 parts of N-methylpyrrolidone, 6 parts of toluenesulphonic acid, 3 parts of trimellitic anhydride and 100 parts of phthalic anhydride were added dropwise at 145° C. a solution of 110 parts of N-methylpyrrolidone and 89 parts of 1,8-diaminonaphthalene over 4 hours.

Afterwards the batch was stirred at 145° C. for 2 hours, cooled down to room temperature and filtered with suction. The filter residue was then washed with 125 parts of N-methylpyrrolidone and 500 parts of hot water and dried at 80° C. under reduced pressure.

This provided 133 parts of the dye of the formula (I) in the β-form having the crystal form described in FIG. 2.

Inventive Example 2

To a mixture of 340 parts of N-methylpyrrolidone (NMP), 6 parts of toluenesulphonic acid and 100 parts of phthalic anhydride was added dropwise at 145° C. a solution of 110 parts of N-methylpyrrolidone and 89 parts of 1,8-diaminonaphthalene over 4 hours.

Afterwards the batch was stirred at 145° C. for 2 hours, cooled down to room temperature and filtered with suction. The filter residue was then washed with 125 parts of N-methylpyrrolidone and 500 parts of hot water and dried at 80° C. under reduced pressure.

This provided 132 parts of the dye of the formula (I) in the α-form having the crystal form described in FIG. 1.

Inventive Example 3

130 parts of the dye of the formula I in the α-form (prepared according to Comparative Example 1) and 4 parts of the condensation product of trimellitic acid and 1,8-diaminonaphthalene (formula II) were introduced into 350 parts of NMP and heated to 145° C. The batch was then cooled down to 20° C. over 6 hours, subsequently stirred at 20° C. for 1 hour and filtered. The filter cake was washed with 100 parts of methanol and then with 500 parts of water. Drying at 80° C. under reduced pressure resulted in 124.6 parts of the dye of the formula I in the β-form having the crystal form described in FIG. 2.

Property Profiles

A comparison of the properties of the dye of the formula (I) in the α-form according to Comparative Example 1 or 2 and the β-form according to either of Inventive Examples 1 and 3 presents the following table.

|  | α-form | β-form |
| --- | --- | --- |
| Bulk density in g/cm$^3$ | 0.16 | 0.29 |
| Filtration to isolate the dye from the reaction mixture | good | very good (even without application of reduced pressure) |
| Solids content of an aqueous slurry containing 2% by weight, based on the slurry, of an EO/PO block polyetherpolyol (Pluronic ®) as an emulsifier | 14 to 20% by weight | 38 to 45% by weight |

In addition, the α-form can only be prepared in a smaller amount than the β-form in an industrial-scale batch in a defined reaction vessel, since the α-form very quickly gives rise to stirring problems. This is not the case with the β-form. Hence the β-form also permits a higher space-time yield.

What is claimed is:

1. A dye of the formula (I)

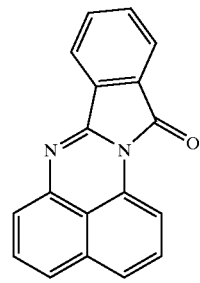

(I)

in a crystal form (β-form) that comprises lines at the following diffraction angles 2 (°):

9.935, 12.734, 13.378, 24.033, 24.852, 27.455 in the X-ray diffraction diagram (CU-K$_\alpha$ radiation).

2. A process for preparing the dye according to claim 1, comprising reacting phthalic anhydride and 1,8-diaminonaphthalene at a temperature of 90 to 200° C. in an organic solvent in the presence of trimellitic acid or suitable derivatives thereof.

3. The process of claim 2, wherein the organic solvent comprises N-methylpyrrolidone.

4. The process of claim 2, comprising further reacting in the presence of toluenesulphonic acid.

5. A process for preparing the dye according to claim 1, comprising dissolving the α-form of the dye of the formula (I), having lines at the following diffraction angles 2 (°):

9.911, 11.799, 12.412, 13.150, 23.682, 24.122, 24.852, 26.765, 27.476, in the X-ray diffraction diagram (Cu-K radiation), in an organic solvent and precipitating the dye of the formula (I) in the presence of trimellitic acid or suitable derivatives thereof.

6. An aqueous dispersion comprising 30 to 50% by weight of the dye of claim 1 and 0.1 to 5% of a dispersant, based on the dry dye.

7. A solid preparations containing 95 to 99.9% by weight of the dye according to claim 1 and 0.1 to 5.0% by weight of a dispersant, each percentage being based on the preparation.

8. A composition containing the dye of claim 1 and a plastic.

* * * * *